(12) United States Patent
Jacobs

(10) Patent No.: US 6,256,586 B1
(45) Date of Patent: Jul. 3, 2001

(54) SYSTEM FOR PREDICTING WIND-DRIVEN SETUP OR SETDOWN IN CONTINENTAL SHELF REGION

(75) Inventor: Greg A. Jacobs, Slidell, LA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 0 days.

(21) Appl. No.: 09/371,122

(22) Filed: Aug. 10, 1999

(51) Int. Cl.[7] .................................................. G06F 169/00
(52) U.S. Cl. ................................................................ 702/3
(58) Field of Search ............................. 702/3, 5; 342/26, 342/120, 121

(56) References Cited

U.S. PATENT DOCUMENTS 5,469,168 * 11/1995 Anderson ................................ 342/26
5,923,283 * 7/1999 Gouenard et al. ..................... 342/120

OTHER PUBLICATIONS

Fieguth, P.W., et al., "Multiresolution optimal interpolation and statistical analysis of TOPEX/POSEIDON satellite altimetry", IEEE Transactions on Geoscience and Remote Sensing, vol. 33, Iss. 2, Mar. 1995, pp. 280–292.*

Jacobs, G., "Statitstical Models", web pages published on the WWW Internet Apr. 10, 1988, 2 pages.*

Jacobs, Sea Surface Height Variations in the Yellow and East China Seas 1. Linear Response to Local Wind Stress, J. Geophy. Res., vol. 103, No. C9, pp. 18,459–18,477, Aug. 1998.

Hogan et al., The Description of the Navy Operational Global Atmospheric Prediction System's Spectral Forecast Model, Mo. Wea. Rev., vol. 119, pp. 1786–1815, Aug. 1991.

Toll et al, An Operational Evaluation of the Navy Operational Global Atmospheric Prediction System (NOGAPS): 48 Hour Surface Pressure Forecasts, Mo. Wea. Rev., vol. 113, pp. 1433–1440, Sep. 1985.

Hogan et al, Sensitivity Studies of the Navy's Global Forecast Model Para Meterizations and Evaluation of Improvements to NOGAPS. Mo. Wea. Rev., vol. 121, pp. 2373–2395, Aug. 1993.

Rosmond, The Design and Testing of the Navy Operational Global Atmospheric Prediction System, Wea. & Fore., vol. 7, pp. 262–270, Jun. 1992.

* cited by examiner

Primary Examiner—Donald E. McElheny, Jr.
(74) Attorney, Agent, or Firm—John J. Karasek

(57) ABSTRACT

This system utilizes satellite observations of sea level variations, and relates them to wind stress through the use of an algorithm that generates a relationship between long time period climatologies of both sea level and wind stress. A linear transfer function is utilized in the algorithm. The algorithm provides a solution to the problem of generating the response function to an under-sampled process and allows wind stress distant in space and lagged time to affect the sea level variations at all points. The resulting statistical model allows direct prediction of wind driven setup or setdown at the climatological observation points given a prediction of only the wind stress field. Minimizing the expected error variance generates the optimal estimation of the time invariant linear transfer function. This leads to an extended empirical orthogonal function (EEOF). The sea surface height (SSH) response to each wind mode is determined. For a prediction of sea wind-driven setup or setdown, the predicted wind is decomposed into the previously derived EEOF modes and the response of each mode is summed to generate the total response.

5 Claims, 5 Drawing Sheets

SYSTEM FOR PREDICTING WIND-DRIVEN SETUP OR SETDOWN IN CONTINENTAL SHELF REGION

BACKGROUND OF THE INVENTION

1. Field of the Invention

This invention generally pertains to the prediction of wind-driven setup or setdown on the continental shelf, and mor specifically to an algorithm for the prediction of wind-driven setup or setdown utilizing information gathered from satellite observation of the waters surrounding the coastal region.

2. Description of the Related Art

One of the principle driving forces on continental shelf circulation is surface wind stress. The wind stress during extreme events can cause a sea level rise (setup) or sea level drop (setdown) in coastal areas. One approach to providing a useful wind setup or setdown forecast is through statistical use if in situ measurements. By relating the observed sea level changes to the observed wind stress forcing, it is possible to generate the expected relation between the two. In order to generate the requires statistical relations in terms of a linear transfer response function, a long time period climatologies of both sea level and wind stress are required. However, there are few in situ observations of sea level that cover a sufficiently long time period to be of use in this procedure.

Examining the sea surface response to wind forcing leads to an understanding of how wind stress may force subsurace currents and control mixing across the shelf break.

Altimeter-measured sea surface height (SSH) variations collected by a satellite, such as the TOPEX/POSEIDON (T/P), presents an excellent opportunity to observe the behavior of the ocean in the continential shelf region. The altimeter data implications are well understood in the open ocean, and this has been exploited in many studies to examine ocean circulation physics. The lack of altimeter data applications to shallow water regions such as the continential shelf stems mainly from the lack of sufficient temporal sampling. Examining the evolution of the SSH response to a single winter wind burst or the passage of an individual typhoon or hurricane is impossible with a space-borne instrument that may sample only one ground track in the region of interest during a given day.

However, undersampled signals are not hopelessly lost. In particular, the dynamics of a linear deterministic process may be determined from observations of the forcing and response. For the case of wind-driven SSH, knowledge of the time of the measurements and the simultaneous forcing function allows the analysis to be made through a statistical approach. Another example is diurnal and semidiurnal tides which are aliased by the altimeter sampling scheme. In spite of the undersampling, much work has been done to use altimeter data to estimate tides both globally in deep water and locally in shallow water.

Wind stress forcing is a stochastic process. For each SSH measurement the wind forcing must be measured at the same time. Wind stress products, such as those of the Navy Operational Global Atmospheric rediction System (NOGAPS), provide fields at 12-hour intervals or less, which is sufficient temporal sampling to measure wind forcing events. The wind fields may be sampled at the altimeter measurement times, which allows determination of stochastic, or averaged, SSH response. If there are several observations of SSH and several simultaeous observations of the wind stress, the average SSH response can be calculated. The temporal sampling is inconsequential as long as a sufficient number of wind events and their responses are observed. In addition, by examining the time-lagged cross covariance of the SSH and wind stress, the response to the time-lagged wind stress and hence the stochastic temporal evolution of the SSH response may also be examined.

A significant problem in this process is the sample time difference between different altimeter ground tracks. The temporal difference (up to 5 days for T/P) implies that the satellite may have sampled a response to entirely different wind events along two different ground tracks. Thus the errors in the cross covariance between SSH and wind stress are more correlated along ground tracks than between different ground tracks. In the limit of an increasingly long time period data set, the points along each different ground track will be influenced by a sufficient number of events so that errors in the SSH to wind stress cross covariance will be small. For a data set of about 100, it is small enough that the response function for two ground tracks that are slightly different even at the same point in space. The effects on the fraction of SSH variability that may be explained are even larger. Two tracks at a crossover point may show identical response to wind forcing, but the calculated response may be able to explain much more variability along one ground track than the other because of the different events observed by the two time series.

Other methods for calculating the SSH response to wind stress include canonical correlation analysis (CCA) or principle estimator pattern (PEP) analysis. For these analyses the empirical orthogonal function (EOF) expansion of both variables (wind stress and SSH) is required. Studies of the altimeter data through extended EOF (EEOF) decompositions have been conducted to understand the annual and interannual variability. The EEOF decomposition requires gridding the altimeter data in space and time. However, for vartiations that are shorter than the satellite sampling period it is not possible to interpolate the data to a regular grid while maintaining the ocean variability of interest. Thus the EOF expansion of the altimeter SSH is not possible for this study. A numerical ocean model may also be used to produce the SSH response to wind forcing in both linear and nonlinear systems. However, numerical models are often hampered by the lack of accurate geometry data for coastline positions and bathymetry. Parameterization of processes such as boundary conditions, friction, and turblence also present challenges. Thus it is useful to examine the SSH response from a purely observational point of view.

BRIEF SUMMARY OF THE INVENTION

The object of this invention is to predict sea level change due to wind events with time scales of one day.

This and other objectives are achieved by a system that makes satellite observations of sea level variations, and relates them to wind stress through the use of an algorithm. To generate a relationship between long time period climatologies of both sea level and wind stress, a linear transfer function is utilized in the algorithm. The algorithm provides a solution to the problem of generating the response function to an under-sampled process and allows wind stress distant in space and lagged time to affect the sea level variations at all points. The resulting statistical model allows direct prediction of the sea level changes due to wind events with time scales of one day at the climatological observation points given a prediction of only the wind stress field. Minimizing the expected error variance generates the optimal estimation of the time invariant linear transfer function. This leads to an extended empirical orthogonal function (EEOF) analysis of the wind stress, and the sea surface height (SSH) response to each wind mode is determined. For a prediction of sea level changes due to wind event with time scale of one day, the predicted wind is decomposed into the derived EEOF modes, and the response to each mode is summed to generate the total response.

DETAILED DESCRIPTION OF THE INVENTION

Figure 1:
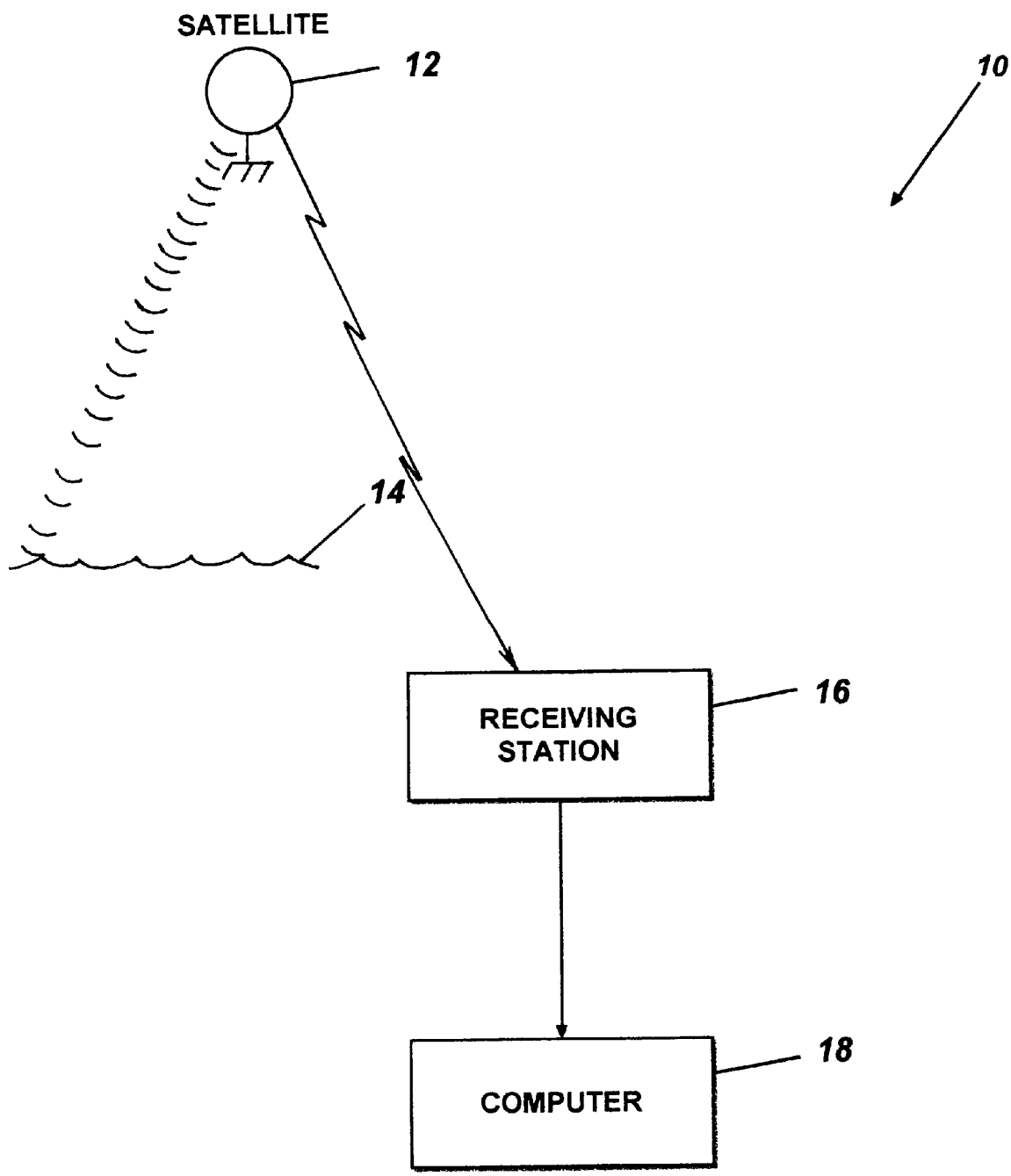
FIG. 1 shows a system diagram of the wind-driven setup or setdown prediction system.

The system 10 taught here for the determination of wind driven sea level rise (setup 0 or sea level drop (setdown) relies on satellite 12 observations of sea level 14 variations which are interrogated by a ground station 16, as shown in FIG. 1. The system 10 also provides a novel solution to the problem of generating the response function to an under-sampled process. In addition, the system 10 described here allows a computer 18, utilizing an algorithm described below, to determine wind stress distant in space and lagged in time to affect the sea level variations at all points. This capability is essential for accurate prediction. The approach for this technique is based on the statistical response of the sea level to wind stress.

Figure 2:
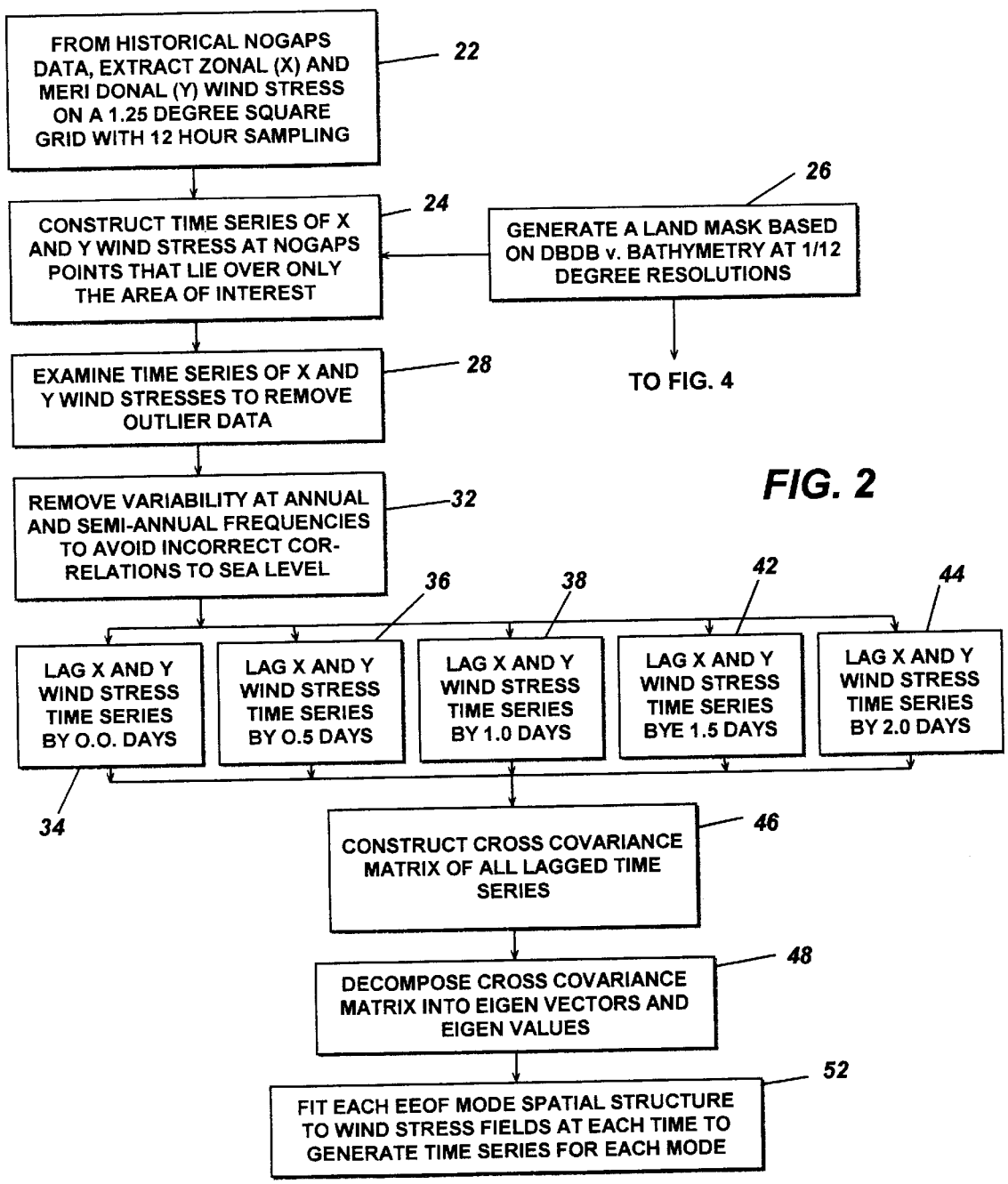
FIG. 2 shows a flow chart of an algorithm for implementing the wind-driven setup or setdown prediction system.
Figure 3:
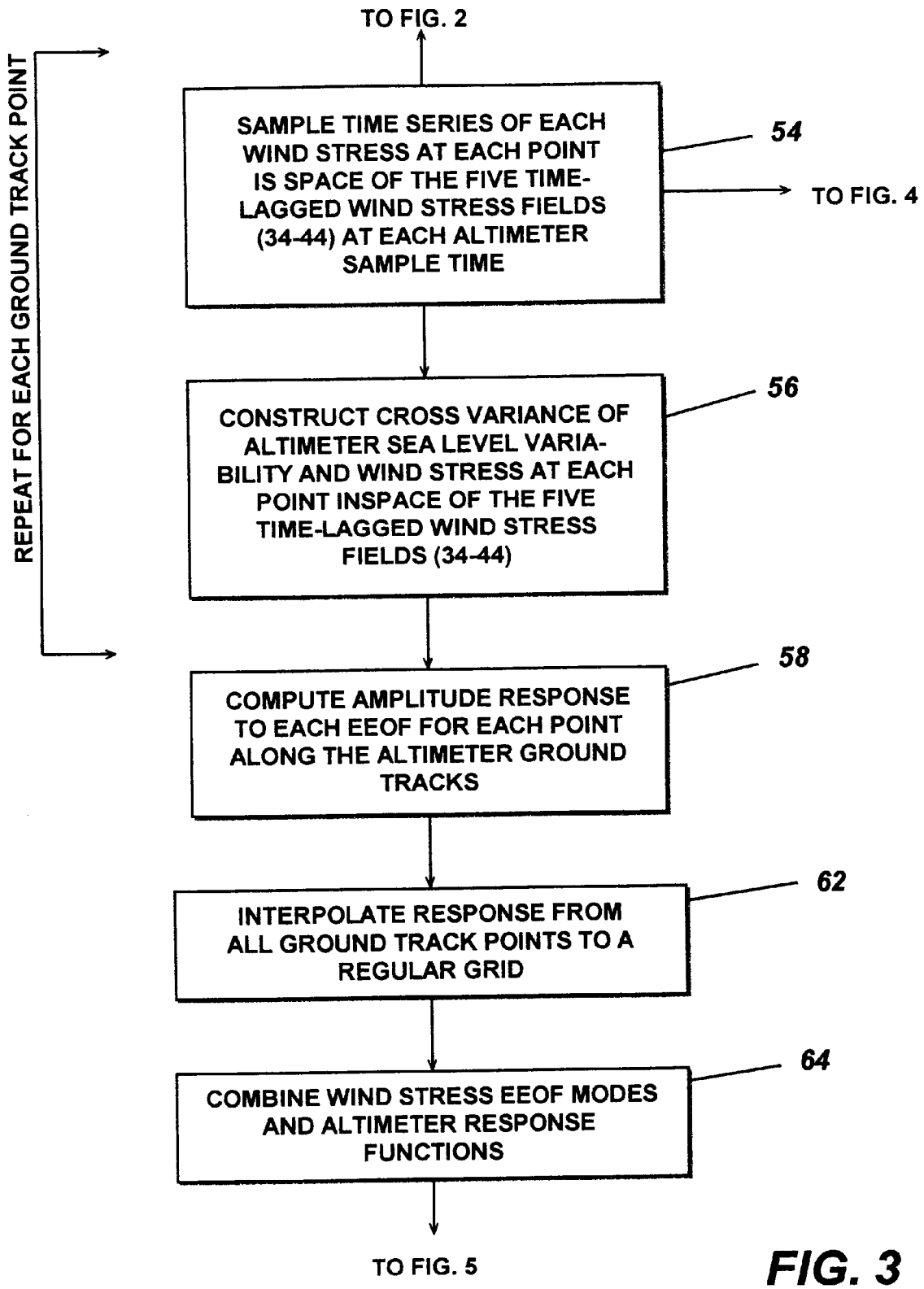
FIG. 3 shows a flow chart of an algorithm for implementing the wind-driven setup or setdown prediction system.
Figure 4:
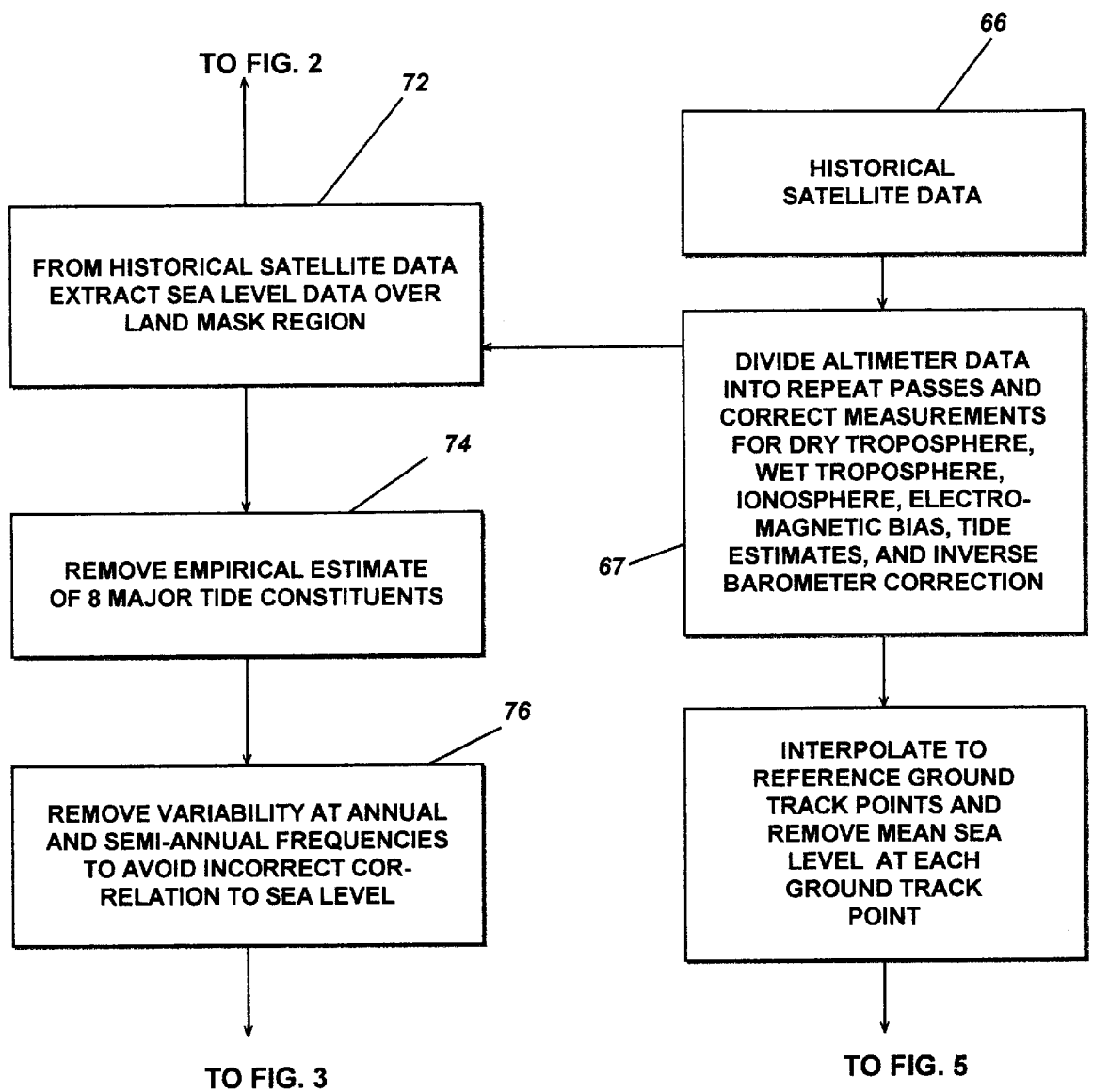
FIG. 4 shows a flow chart for implementing the wind-driven setup or setdown prediction system.
Figure 5:
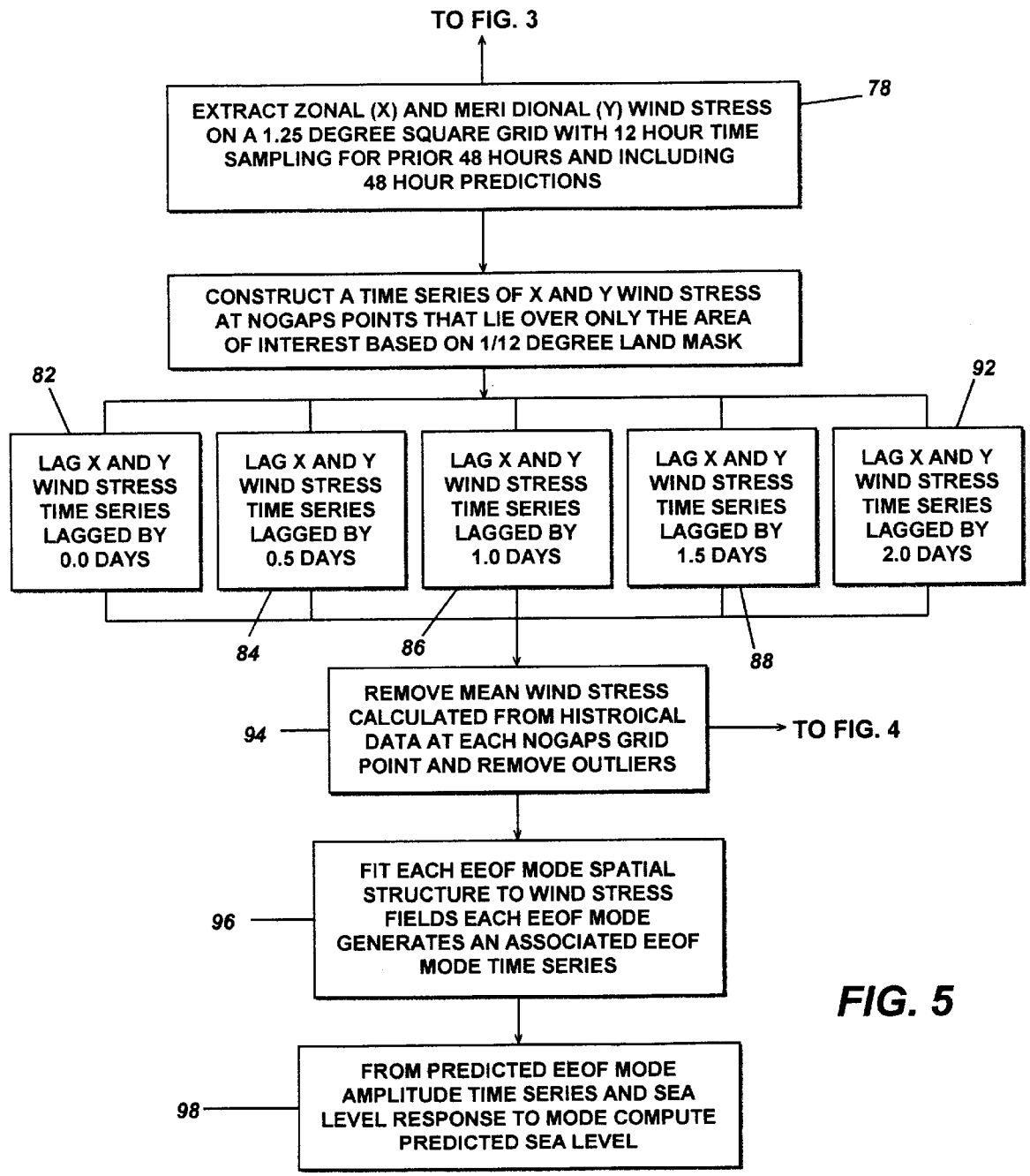
FIG. 5 shows a flow chart of an algorithm for implementing the wind-driven setup or setdown prediction system.

The resulting statistical model allows direct prediction of sea level changes due to wind events with time scales of one day at the climatological observation points given a prediction of only the wind stress field. Minimizing the expected error variance generates the optimal estimation of the time invariance linear transfer function. This procedure leads to an extended empirical orthogonal function (EEOF) analysis of the wind stress field, as shown in FIG. 2. The sea surface height (SSH) response to each wind mode is determined, as shown in FIG. 3 and FIG. 4. For a prediction, the predicted wind stress is decomposed into the previously derived EEOF modes, and the sea level response to each mode is summed to generate the total response, as shown in FIG. 5.

The response of a linear system to an input forcing may be written in terms of a transfer function. The main purpose of this technique is to estimate and apply the transfer function that relates to the SSH at any point and time to the wind forcing over all space and time up to the present time. The solution and application of this technique overcomes the problems of temporal under-sampling. In the most general case, the SSH inferred from the wind stress is given as:

$$SSH(x, t) = \int_S \int_{T=-\infty} h^T(x, t, x', t') W(x', t') dt' dx' \quad (1)$$

where the integrals are over all space (S) and all time (T) and x and t are the position latitude and longitude) and time at which the SSH response is being calculated. The wind stress W(x',t') is a column vector at the position x' and time t'. The function h(x,t,x',t') is the two-element vector transfer function estimated by this calculation technique. It gives the contribution of the wind stress components at a position x' and time t' to the SSH at x and t. The winds over all space (the globe) and all time prior to t may contribute to the SSH response. This implies that the transfer function is a six-dimensional, two-element vector function.

It is assumed that the transfer function is time variant. The implication is that the transfer function is not a function of both t and t' but only of (t−t'). This assumption eliminates one dimension from the transfer function. Because the regional hydrography of an area of interest varies significantly throughout the year, the response to the same wind forcing will vary. Certainly, some improved results would be realized if the transfer function were allowed to vary seasonally. Since the main response on the continental shelf is barotropic, and seasonal variations in vertically averaged density are small, the errors induced are not significant. If the transfer function were allowed to vary in time, it would require sufficient data at each point in time to compute an estimate of h(x, t ,x',t'), and the time-limited altimeter data set precludes this.

The second assumption to simplify the transfer function solution limits the time and the space extent over which winds influence SSH. This sets the transfer function to zero for particular values of x' and (t−t'). The time interval of influence should be larger than the regional transient response time to an impulsive forcing. An influence time of 2 days is sufficient to include the adjustment to local wind forcing in the transfer function in even the largest continental shelf areas.

Limiting the region of influence of winds is equivalent to the temporal restriction. Winds over the entire world drive the global circulation, and global circulation variations influence in sea level on continental shelves. In addition, barometric and baroclinic waves generated overt he open ocean can influence the shelf region. However, the time delay between the wind events across the open ocean and the response on the shelf is much longer than a few days. Thus both the temporal and spatial restrictions of the wind stress influence range restrict the process that the transfer function is capable of representing to the same range. The transfer function will replicate the dynamics of locally generated wind-driven sea level changes.

Altimeter and Wind Data Sets

Satellite altimeter data, preferably from a TOPEX/POSEIDON (T/P) satellite, or an equivalent satellite, forms the SSH data used in the computational sequence of the system. In a typical computation sequence, referring to FIG. 4, T/P data are first broken into arcs 67 composed of one satellite revolution beginning and ending at the satellite's southernmost extent. Arcs that fall on the same ground track are grouped 67 into a set of repeat (or collinear) passes. Computed orbits for T/P are based on the Joint Gravity Model (JGM) −3 gravity field. Atmospheric corrections (dry troposphere, wet troposphere, and ionosphere)are applied 67, as well as solid earth tides, and ocean tide estimate, tidal loading, an electromagnetic bias, and an inverse barometer correction based on the local instantaneous barometric pressure.

SSH from all repeat passes is interpolated 68 along ground tracks to points spaced 1 s (i.e., ~6.5 km along track), and the mean at each point along the ground tracks is subtracted 68 removing both the geoid signal and the mean dynamic topography. Data is the culled 72 down to only the area of interest based on a 1/12 degree land mask. The largest source of contamination is errors in the tide solution. While the tide model is a finite element model with relatively high resolution in the example region, the spectra of the SSH after removing the tide model estimate indicates that significant energy remains at the alias frequencies (mainly M2 at 6 cycles per year (CPY)). The annual variability is smaller than the residual tide variability. To remove residual tide variability 74, a least squares fit of eight principle tide frequencies (M2, S2, K1, O1, N2, P1, K2, and MU2) at each point along the ground track is used. The spectra after this empirical removal indicates that the annual variability is now the dominant frequency. Remaining energy is spread across the spectrum.

Referring to FIG. 2, the wind data set is obtained from NOGAPS mode analysis 22 (SEE, Hogan et al., SENSITIVITY STUDIES OF THE NAVAL GLOBAL FORECAST MODEL PARAMETERIZATIONS AND EVALUATION OF IMPROVEMENTS TO NOGAPS, Mon. Weather Rev., Vol. 119, No. 8, pp. 2373–2395, 1993; T. E. Rosmond, THE DESIGN AND TESTING OF THE NAVY OPERATIONAL GLOBAL ATMOSPHERIC PREDICTION SYSTEM, Weather Forecasting, Vol. 7, No. 2, pp. 262–272, 1992; Hogan et al., THE DESCRIPTION OF THE NAVY OPERATIONAL GLOBAL ATMOSPHERIC PREDICTION SYSTEM, Mon. Weather Rev., Vol. 119, No. 2, pp. 1786–1815, 1991; Toll et al., AN OPERATIONAL EVALUATION OF THE NAVY OPERATIONAL GLOBAL ATMOSPHERIC PREDICTION SYSTEM, Mon. Weather Rev., Vol. 113, No. 9, pp. 1433–1440, 1985. The foregoing publications are hereby incorporate in total by reference.) The resolution of the data is $1.25° \times 1.25°$ spatially and 12 hours time. Wind stress data is first culled down 24 to only the area of interest based on a $\frac{1}{12}$ degree land mask. Outlier data are also removed 28. The seasonal variability is removed 32 by a least squares fit to the x (positive eastward) and y (positive northward) wind stress time series at each point in space.

The SSH response at a point x is influenced by wind stresses remote in space and time. The optimal estimate of the transfer function leads to a natural solution to this problem. The solution involves an EEOF decomposition of the wind stress data and calculating the SSH response to each mode. By including only the most significant modes the calculations provide the most significant contribution to the transfer function with the smallest number of modes. The response to each wind stress mode will depend on the dynamics linking wind stress to SSH as well as the regional geometry.

An optimal estimate of the transfer function $h(x, t+j, x_j')$ is based on the assumption that the transient response time of the SSH to the wind stress is less than 2 days. This assumption covers the barotropic shallow wave propagation time over the largest continental shelves. Using 12-hour lag increments, a set of five time-lagged wind fields with lags ranging from 0 to 48 hours is produced 34, 36, 38, 42, and 44. The optimal estimate of $h(x, t+j, x_j')$ is given by $$\overline{\overline{<W(x_i'), W(x_j')>}}\overline{h^-} = \overline{<W(x_j'),SSH(x)>}$$

where the single overbar denotes a vector, the double overbar denotes a matrix. The value $\overline{\overline{<W(x_i'), W(x_j')>}}$ is the cross-covariance matrix of the time series of each x and y wind stress component from all points of all 5 lagged wind stress fields. In an area of interest, assuming there are 109 water points in the Navy Operational Global Atmospheric Prediction System (NOGAPS) grid with an x and y component to each, thus $\overline{\overline{<W(x_i'), W(x_j')>}}$ is a 1090 by 1090 matrix. The vector $h^-$ contains the transfer function coefficients for the x and y wind stress components, and $\overline{<W(x_j'), SSH(x)>}$ is a vector of the cross-variance between the x and y wind stress components and the SSH. This procedure produces the optimal estimate of the contribution of the x and y wind stress over a 48-hour period at every point x' to the SSH at the point x.

EEOF Wind Stress Modes

The cross-variance matrix 46 of the wind stress, $\overline{\overline{<W(x_i'), W(x_j')>}}$, produces information on the wind field itself. Since five time-lagged fields are included in the creation of this matrix, an eigendecomposition 48 produces the EEOF analysis of the wind fields. Each mode of the decomposition indicates the temporal evolution (over a 2-day time period) and times when these events occurred. The second useful product from the eigendecomposition is an understanding of the importance of each mode, which is reflected by its eigenvalue. The eigenvalue is equal to the variability explained by each mode. Time series of each EEOF mode amplitude 52 are construed based on the EEOF mode and the five time-lagged data sets 34, 36, 38, 42, and 44. The first 20 modes account for 73% of the variability in the wind stress field. To account for 90% of the variability, 110 modes are required. There are a number of modes equal to the number of coefficients for which the computation solves (1090). The last 200 modes have very small eigenvalues that are more than 6 orders of magnitude less than the largest eigenvalue, indicating the they contribute very little to the wind field and that the wind field contains large spatial and temporal correlations. By using a subset of the most important modes the number of parameters fit to the data is reduced.

SSH Response to the Wind Modes

The eigendecomposition of the wind stress covariance matrix 48 is written as $$\overline{\overline{<W(x_i'), W(x_j')>}} = \overline{\overline{P}}\overline{\overline{\lambda}}\overline{\overline{P}}^T$$

where P is the matrix of column eigervectors and $\lambda$ is the diagonal matrix of eigenvalues. Thus the optimal solution for the transfer function coefficients at a point x along the altimeter ground track is $$h^- = \overline{\overline{P}}\overline{\overline{\lambda}}^{-1}\overline{\overline{P}}^T \overline{<W(x_j'),SSH(x)>}$$

The wind stress of all five timed lagged data sets 34, 36, 38, 42, and 44 is sampled 54 at the same times at which the altimeter sampled point x. The cross variance of wind stress $W(x_i')$ and sea level $SSH(x)$ is then computed 56.

The SSH at a particular time may be reconstructed as $$SSH(x, t) = \overline{w(t)}^T \overline{h} \qquad (3)$$
$$= \overline{w(t)}^T \overline{\overline{P}}\overline{\overline{\lambda}}^{-1} \overline{\overline{P}}^T \overline{<W(x_j'), SSH(x)>}$$
$$= \overline{A(t)}^T \overline{M_W(x)}$$

where w(t) is a column vector of the x and y wind stress components at all points over the region including all values within 48 hours of time t, $$\overline{A(t)}^T = \overline{w(t)}^T \overline{\overline{P}}$$

$$\overline{M_w(x)} = \overline{\overline{\lambda}}^{-1} \overline{\overline{P}}^T \overline{<W(x_j'),SSH(x)>}$$

The vector $\overline{A(t)}^T$ provides the decomposition of the wind field into the EEOF modes; each element of $\overline{A(t)}^T$ is the amplitude of the corresponding EEOF mode at time t. The time variations of the elements of $\overline{A(t)}^T$ are proportional to the time series of the EEOF modes. Thus the temporal SSH response is proportional to the temporal variability in the wind stress modes.

The vector $\overline{M_w(x)}$ is independent of time and gives the weighting of each EEOF mode to the transfer function, and these elements provide the spatial variations of the SSH response 58. The transfer function from the wind stress at a point $(x_j', t-t')$ to the SSH at point $(x, t)$ is a weighted sum of the EEOF modes evaluated at point $(x_j', t-t')$. The space-time contribution of a mode to the transfer function is the element of $\overline{M_w(x)}$ multiplied by the EEOF modes already discussed.

The estimated response at each ground track point to a particular wind stress EEOF mode may be interpolated spatially to provide a complete coverage map of the estimated EEOF mode response. Referring to FIG. 3, the interpolation 62 used here is a weighted averaging. The weighting is given by a Gaussian function with a 150 km e-folding length scale. Once the two-dimensional gridded response function for each mode is generated, the EEOF modes and the sea level response are saved to computer data files 64 for use in future prediction.

Prediction Cycle

Referring to FIG. 5, NOGAPS wind stress on a 1.25×1.25 degree grid with twelve hour time resolution 78 is used for predicting sea level variations. NOGAPS wind fields provide 49-hour predictions. They are used in combination 78 with the prior 48 hours data. The NOGAPS data are culled 79 down to the area of interest based on 1/12 degree land mask. The time series of wind stress are lagged 82, 84, 86, 88, and 92 by 12-hour increments to generate five time-lagged data sets with time lags ranging from 0 to 48 hours. This processing duplicates the steps 22 and 24, which were applied to the historical NOGAS data. The mean wind stress based on historical data is then removed 94 at each grid point. In addition, outliner data are determined by values that lie more than four standard deviations from the mean. These data are removed 94 from the time series.

The previously determined wind stress modes are least squares fit 96 to the time series of the five time-lagged wind stress fields 82, 84, 86, 88, and 92. The result is a time series of the amplitude for each wind stress mode. This is the vector $A(t)^T$ required for sea level prediction. The sea level response to the mode is described by the vector $M_w(x)$, which was developed in steps 54 through 64 of FIG. 3. The sea level response to the wind stress is then computed 98 by $$SSH(x,t) = A(t)^T M_w(X).$$

Referring to FIGS. 2 through 5, the foregoing is accomplished by the following computer steps:
(1) Referring again to FIG. 4, divide altimeter data into collinear repeat passes and apply path delay corrections 67.
(2) Interpolate data to reference ground track polynomial interpolation of sea surface height 68.
(3) Remove mean SSH at each position along ground track 68.
(4) Remove error in orbit solution 69.
(5) Extract altimeter data over region of interest 72.
(6) Estimate residual tidal constituent using least squares. Estimate and remove eight major tide constituents 74.
(7) Remove annual and semi-annual variabilities from sea level 74.
(8) Referring again to FIG. 2, process wind stress data from the Fleet Numerical Meterology and Oceanography Center (FNMOC) data to provide wind stress on a square grid at a spacing of 1.25 degrees and a time interval of 12 hours 22.
(9) Extract wind data over region of interest 24 based on land mask 26.
(10) Determine bad data points 28.
(11) Remove annual and semi-annual variability of Eastward and Northward wind stress 32.
(12) Take time series of wind stress and lag it by 12 hours 34, 36, 38, 42, and 44.
(13) Provide x and y components of wind stress lagged by 0.0, 0.5, 1.0, 1.5 and 2.0 days 34, 36, 38, 42, and 44.
(14) Take the wind stress data sets in (13) and construct cross covariance matrix between all East and North wind stresses 46.
(15) Compute eigendecomposition of covariance matrix to provide a set of extended empirical orthogonal functions (EEOF) modes 48.
(16) For each EEOF mode produce a time series from the five time-lagged wind stress data sets 34, 36, 38, 42, and 44 to provide a wind stress time series for each EEOF mode 52.
(17) For each ground track point, take each EEOF mode, sample the time series of the mode at altimeter measurement times 54.
(18) Referring again to FIG. 3, construct cross covariance of sea level at each ground track point and each EEOF mode 64.
(19) Compute magnitude of sea level response to each mode 54.
(20) Interpolate responses to fill in the grid track points 62.
(21) Save EEOF modes and seal level response to data files for prediction 64.
(22) Referring again to FIG. 5, from FMNOC data extract the wind stress in the area of interest 78.
(23) Extract the wind stress 48 hours prior and the wind stress 48 hours after the present time, and produce a lagged time series of wind stresses to produce five wind stresses data sets with time lags of 0.0, 0.5, 1.0, 1.5 and 2.0 days 82, 84, 86, 88, and 92.
(24) Remove mean wind stress at each point and remove outlying data 94.
(25) Fit each EEOF mode to the four days of data to produce a four day time series for each EEOF mode 96.
(26) From each time series EEOF mode combine with expected sea level response to predict sea level response 98.

The responses of SSH produced by this invention to wind stress on the continential shelf region has been examined through a series of increasingly complex transfer functions. The local instantaneous response is consistent with an Ekman transport moving mass to the right of the wind stress, creating a SSH setup gradient in the direction of the Ekman transport. The SSH response at one point is dependent on wind stress that is remote in both space and time. The results in one ocean area creates a SSH change over other adjacent areas. Including time-lagged wind stresses in the transfer function increases the significance of the SSH reconstruction.

An optimal estimate of the transfer function requires the calculation of the wind stress covariance matrix that includes the wind stress fields at increasingly longer ime lags. Lags of from 0 to 48 hours in the description of the preferred embodiment so that expected transient response time in an area of interest is included. An eigendecomposition of wind stress covariance matrix leads to the EEOF expansion. The contribution of each EEOF mode to the transfer function indicates areas most affected by the wind stress modes.

The results that have been experienced in demonstrations have indicated the utility of altimeter data in the continental shelf region for understanding the SSH response to local wind forcing. The SSH gradients imply pressure gradients across the region, and these pressure gradients are expected to drive subsurface currents. The results gained from demonstrations have also been used to evaluate a numerical model and have been used to observe coastal waves generated by the regional wind stress.

The publication Jacobs, SEA SURFACE HEIGHT VARIATIONS IN THE YELLOW AMD EAST CHINA SEAS 1. LINEAR RESPONSE TO LOCAL WIND STRESS, J. Geophy. Res., Vol. 103, No. C9, pp. 18,459–18, 477, August 1998, provides the results of a simulation of the computation sequence applied to data obtained from the TOPEX/POSEIDON satellite. This publication is hereby incorporated, in total, by reference.

Although the invention has been described in relation to an exemplary embodiment thereof, it will be understood by those skilled in the art that still other variations and modifications can be affected in the preferred embodiment without detracting from the scope and spirit of the invention as described in the claims.

What is claimed is:

1. A system for prediction of wind-driven setup or setdown in continental shelf area comprising:
   a satellite capable of transmitting sea height;
   a receiving station for receiving the sea surface height data; and
   means for calculating an extended empirical orthogonal function of a wind stress field mode amplitude series and sea level response to said mode to produce a predicted sea level wind-driven setup in the continental shelf region.

2. A system, as in claim 1, wherein the means for calculating is a computer.

3. A system for prediction of wind-driven setup in continental shelf area comprising:
   a satellite system capable of transmitting sea surface height (SSH) data;
   a receiving station capable of receiving the sea surface height data from the satellite; and
   a computer system to
   (a) divide altimeter data from the satellite system into collinear repeat passes and apply path delay corrections to said data;
   (b) interpolate said data to reference ground track polynomial interpolation of sea surface height,
   (c) remove mean SSH at predetermined positions along the ground track,
   (d) remove errors in orbit determination,
   (e) extract altimeter data over region of interest,
   (f) estimate residual tidal constituent using least squares method and estimate and remove eight major tide constituents from the data,
   (g) remove annual and semi-annual variabilities from sea level data,
   (h) process wind stress from historical data to provide wind stress on a square grid at a predetermined spacing and time,
   (i) extract wind data over region of interest based on land mask,
   (j) determine bad data points within the data,
   (k) remove annual and semi-annual variability of Eastward and Northward wind stress,
   (l) lag a predetermined time series of wind stress by a predetermined time period,
   (m) provide x an y components of wind stress lagged by a predetermined grouping of times,
   (n) compute eigencomposition of covariance to provide a set of extended empirical orthogonal functions (EEOF) modes,
   (o) for each EEOF produce a time series from time-lagged wind stress data sets to provide a wind stress series for each EEOF mode,
   (p) for each ground trackpoint, take each EEOF mode, sample the time series of the mode at altimeter measurement times.
   (q) construct cross variance of sea level at each ground track point and each EEOF mode,
   (r) compute magnitude of sea level response to each EEOF mode,
   (s) interpolate responses to fill between grid tracks points,
   (t) save EEOF modes and sea level response to data files for prediction,
   (u) from historical data determine the wind stress in the area of interest,
   (v) extract the wind stress a predetermined time period to and wind stress a predetermined time period after the present time, and produce lagged time series of wind stresses to produce a predetermined number of wind stress data sets with a predetermined time lags,
   (w) remove mean wind stress points and remove outlying data,
   (x) fit each EEOF mode to a predetermined number of days of data to produce a time series for each EEOF mode for that predetermined number of days,
   (y) from each time series EEOF mode combine with expected sea level response to predict sea level response in the coastal area of interest.

4. A system for prediction of wind-driven setdown in continental shelf area comprising:
   a satellite capable of transmitting sea height;
   a receiving station for receiving the sea surface height data; and
   means for calculating an extended empirical orthogonal function of a wind stress field mode amplitude series and sea level response to said mode to produce a predicted sea level wind-driven setdown in the continental shelf region.

5. A system for prediction of wind-driven setdown in continental shelf area comprising:
   a satellite system capable of transmitting sea surface height (SSH) data;
   a receiving station capable of receiving the sea surface height data from the satellite; and
   a computer system to
   (a) divide altimeter data from the satellite system into collinear repeat passes and apply path delay corrections to said data;
   (b) interpolate said data to reference ground track polynomial interpolation of sea surface height,
   (c) remove mean SSH at predetermined positions along the ground track,
   (d) remove errors in orbit determination,
   (e) extract altimeter data over region of interest,
   (f) estimate residual tidal constituent using least squares method and estimate and remove eight major tide constituents from the data,
   (g) remove annual and semi-annual variabilities from sea level data,
   (h) process wind stress from historical data to provide wind stress on a square grid at a predetermined spacing and time, (i) extract wind data over region of interest based on land mask,
(j) determine bad data points within the data,
(k) remove annual and semi-annual variability of Eastward and Northward wind stress,
(l) lag a predetermined time series of wind stress by a predetermined time period,
(m) provide x an y components of wind stress lagged by a predetermined grouping of times,
(n) compute eigencomposition of covariance to provide a set of extended empirical orthogonal functions (EEOF) modes,
(o) for each EEOF produce a time series from time-lagged wind stress data sets to provide a wind stress series for each EEOF mode,
(p) for each ground trackpoint, take each EEOF mode, sample the time series of the mode at altimeter measurement times.
(q) construct cross variance of sea level at each ground track point and each EEOF mode,
(r) compute magnitude of sea level response to each EEOF mode,
(s) interpolate responses to fill between grid tracks points,
(t) save EEOF modes and sea level response to data files for prediction,
(u) from historical data determine the wind stress in the area of interest,
(v) extract the wind stress a predetermined time period to and wind stress a predetermined time period after the present time, and produce lagged time series of wind stresses to produce a predetermined number of wind stress data sets with a predetermined time lags,
(w) remove mean wind stress points and remove outlying data,
(x) fit each EEOF mode to a predetermined number of days of data to produce a time series for each EEOF mode for that predetermined number of days,
(y) from each time series EEOF mode combine with expected sea level response to predict sea level response in the coastal area of interest.

* * * * *